US011219229B2

(12) United States Patent
Breslin et al.

(10) Patent No.: US 11,219,229 B2
(45) Date of Patent: Jan. 11, 2022

(54) SWEETENED CONSUMER GOODS COMPRISING EXOGENOUS FLAVOR SOURCES AND COLOR

(71) Applicants: Paul Breslin, Pittsburgh, PA (US); Richard H. Selinfreund, Las Cruces, NM (US)

(72) Inventors: Paul Breslin, Pittsburgh, PA (US); Richard H. Selinfreund, Las Cruces, NM (US)

(*) Notice: Subject to any disclaimer, the term of this patent is extended or adjusted under 35 U.S.C. 154(b) by 357 days.

(21) Appl. No.: 15/750,709

(22) PCT Filed: Oct. 18, 2017

(86) PCT No.: PCT/US2017/057143
§ 371 (c)(1),
(2) Date: Feb. 6, 2018

(87) PCT Pub. No.: WO2018/075618
PCT Pub. Date: Apr. 26, 2018

(65) Prior Publication Data
US 2020/0077681 A1 Mar. 12, 2020

Related U.S. Application Data

(60) Provisional application No. 62/409,748, filed on Oct. 18, 2016.

(51) Int. Cl.
*A23L 2/60* (2006.01)
*A23L 27/30* (2016.01)
*A23L 2/54* (2006.01)
*A23L 2/56* (2006.01)
*A23L 2/58* (2006.01)

(52) U.S. Cl.
CPC ...... *A23L 2/60* (2013.01); *A23L 2/54* (2013.01); *A23L 2/56* (2013.01); *A23L 2/58* (2013.01); *A23L 27/36* (2016.08); *A23V 2002/00* (2013.01)

(58) Field of Classification Search
CPC ... A23L 2/60; A23L 27/36; A23L 2/54; A23L 3/56; A23L 2/58; A23L 2/57
USPC ............... 426/590, 599, 648, 615, 658, 661
See application file for complete search history.

(56) References Cited

U.S. PATENT DOCUMENTS

2012/0070386 A1* 3/2012 Wach et al.
2013/0078353 A1* 3/2013 Ryan et al.
2013/0136836 A1* 5/2013 Putter et al.

FOREIGN PATENT DOCUMENTS

CN 104432291 A 3/2015

OTHER PUBLICATIONS

Glucose Syrup, pp. 1-4, 2020, https://en.wikipedia.org/wiki/Glucose_syrup. (Year: 2020).*
Report on Patentability & Written Opinion of the International Searching Authority, dated Apr. 16, 2019, International Bureau.
Kaur, J. A comprehensive review on metabolic syndrome. Cardiol. Res. Pract., 2014, 943162.
Hosseini-Esfahani, F., Bahadoran, Z., Mirmiran, P., Hosseinpour-Niazi, S., Hosseinpanah, F., and Azizi, F. (2011). Dietary fructose and risk of metabolic syndrome in adults: Tehran Lipid and Glucose study Nutrition & Metabolism, 8.
Pollock, N.K., Bundy, V., Kanta, W., Davis, C.L., Bernard, P.J., Zhu, H., Gutin, B., and Dong, Y. Greater fructose consumption is associated with cardiometabolic risk markers and visceral adiposity in adolescents. J. Nutr. 142, 251-257.
Brown, C.M., Dulloo, A.G., Yepuri, G., and Montani, J.P. (2008). Fructose ingestion acutely raises blood pressure in healthy young adults. International Journal of Obesity 32, S77-S77.
Macdonald, I. (1966). Influence of fructose and glucose on serum lipid levels in men and pre- and postmenopausal women. Am. J. Clin. Nutr. 18, 369-372.
Stanhope, K.L., Schwarz, J.M., Keim, N.L., Griffen, S.C., Bremer, A.A., Graham, J.L., Hatcher, B., Cox, C.L., Dyachenko, A., Zhang, W., et al. (2009). Consuming fructose-sweetened, not glucose-sweetened, beverages increases visceral adiposity and lipids and decreases insulin sensitivity in overweight/obese humans. Journal of Clinical Investigation, 119, 1322-1334.
Beck-Nielsen, H., Pedersen, O., and Lindskov, H.O. (1980). Impaired cellular insulin binding and insulin sensitivity induced by high-fructose feeding in normal subjects. Am. J. Clin. Nutr., 33, 273-278.
Lustig, R.H., Mulligan, K., Noworolski, S.M., Tai, V.W., Wen, M.J., Erkin-Cakmak, A., Gugliucci, A., and Schwarz, J.M. Isocaloric fructose restriction and metabolic improvement in children with obesity and metabolic syndrome. Obesity (Silver Spring) 24, 453-460.
Samuel, V.T. Fructose induced lipogenesis: from sugar to fat to insulin resistance. Trends Endocrinol. Metab. 22, 60-65.
Schwarz, J.M., Noworolski, S.M., Wen, M.J., Dyachenko, A., Prior, J.L., Weinberg, M.E., Herraiz, L.A., Tai, V.W., Bergeron, N., Bersot, T.P., et al. Effect of a High-Fructose Weight-Maintaining Diet on Lipogenesis and Liver Fat. J. Clin. Endocrinol. Metab., 100, 2434-2442.
Mayes, P.A. (1993). Intermediary metabolism of fructose. Am. J. Clin. Nutr., 58, 754S-765S.
Stanhope, K.L., Schwarz, J.M., and Havel, P.J. Adverse metabolic effects of dietary fructose: results from the recent epidemiological, clinical, and mechanistic studies. Curr. Opin Lipidol., 24, 198-206.
Ouyang, X., Cirillo, P., Sautin, Y., McCall, S., Bruchette, J.L., Diehl, A.M., Johnson, R.J., and Abdelmalek, M.F. (2008). Fructose consumption as a risk factor for non-alcoholic fatty liver disease. J Hepatol, 48, 993-999.

(Continued)

*Primary Examiner* — Helen F Heggestad
(74) *Attorney, Agent, or Firm* — Withers Bergman; Alan D. Gardner

(57) ABSTRACT

The present invention is directed to sweetened consumer goods that closely match the sweetness, caloric and satiety sensations of the sucrose-containing or high fructose corn syrup-containing consumer goods which are currently available to consumers. Reduced sugar versions of consumer goods may also be generated. The sweetened consumer goods of the invention assist to ameliorate various disease conditions such as fatty liver disease and metabolic disease associated with fructose contained in presently available consumer goods.

12 Claims, No Drawings

(56) References Cited

OTHER PUBLICATIONS

United States. Department of Agriculture. Economic Research Service. Food consumption, prices, and expenditures. In Statistical bulletin. ([Washington, D.C.]: Economic Research Service), p. volumes.

Perez, C., Lucas, F., and Sclafani, A. (1998). Increased flavor acceptance and preference conditioned by the postingestive actions of glucose. Physiol. Behav., 64, 483-492.

DuBois, G.E., and Prakash, I. (2012). Non-Caloric Sweeteners, Sweetness Modulators, and Sweetener Enhancers. Annual Review of Food Science and Technology, vol. 33, 353-380.

* cited by examiner

SWEETENED CONSUMER GOODS COMPRISING EXOGENOUS FLAVOR SOURCES AND COLOR

CROSS-REFERENCE TO RELATED APPLICATIONS

This application claims the benefit of U.S. Provisional Application No. 62/409,748, filed Oct. 18, 2016, and PCT application PCT/US17/57143, filed Oct. 18, 2017.

FIELD OF INVENTION

The present invention is directed to sweetened consumer goods including beverages that closely match the sweetness, caloric and satiety sensations of sucrose-containing or high fructose corn syrup-containing consumer goods and beverages which are currently available to consumers. Such fructose-containing goods and beverages are linked to substantial morbidities through various disease conditions such as fatty liver disease and metabolic diseases associated with the burden presented by dietary fructose contained in these products. In contrast, the sweetened consumer goods and beverages of the present invention maintain consumer appeal while minimizing exposure to dietary fructose, typically presented either in the form of high fructose corn syrup or as sucrose. As such the beverages and consumer goods of the present invention may help ameliorate such morbidities.

BACKGROUND

Sweetened beverages and other sweetened consumer goods are in substantial demand in the United States and elsewhere and are consumed in large quantities. It is widely believed that such sweetened items negatively impact public health because of their caloric content and because of the poor metabolic quality of the excess calories consumed. Nonetheless, such items are highly attractive to consumers, and efforts to replace them have largely failed. As such, there is a need to develop attractive, consumer goods and sweetened beverages (such as carbonated "sodas" or "soft drinks") that do not negatively impact public health.

In the United States, for instance, many millions of cans of soda are consumed yearly and these beverages are sweetened with either sucrose (a disaccharide of half fructose and half glucose) or a form of high fructose corn syrup (HFCS) (which is typically 55% fructose and 45% glucose, although some HFCS used in beverages contain more fructose). Other consumer goods are commonly sweetened by the addition sucrose and forms of HFCS. Examples of other such sweetened consumer goods are non-beverage liquids (such as ketchups, sauces and syrups), semi-solids foods (such as yogurt, puddings, custards and ice creams), solids (such as candies, cookies, cakes, pies, and chips), and solid and liquid mixtures (such as soups, canned fruits and vegetables). Thus, there is a high need to suitably replace sucrose or HFCS in all sweetened consumer goods, while again maintaining their attractiveness to consumers. The total burden presented by dietary fructose to a consumer, of course, will be the total amount of fructose ingested from all dietary sources.

Sucrose, which is used for sweetening multiple commercial beverages and consumer goods, is a disaccharide comprising the compositionally isomeric monosaccharides glucose and fructose when in their monomeric forms. Upon ingestion by humans and other mammals, either in beverages or other foodstuffs, sucrose is hydrolyzed into these component monosaccharides by hydrolases situated in the membrane of the microvilli of the duodenum. The resulting glucose and fructose molecules are rapidly absorbed from the gut into the bloodstream.

Glucose can be utilized freely by any cell of the body. Fructose, however, is almost exclusively metabolized in the liver. As noted above, fructose is a major component of sweetened consumer goods in the United States, and this major component presents a large metabolic burden to the liver.

It follows that the consumption of high quantities of sweetened consumer goods, such as candies, cakes, and soda, increases the amount of fructose exposed to the liver, which over time, can result in non-alcoholic fatty liver syndrome and be a major contributing factor for developing metabolic syndrome, obesity, diabetes, and in extreme cases liver cancer.

The two sweetener systems commonly used, HFCS and sucrose, have very similar levels of fructose, compromising approximately 50% of the carbohydrate by weight. Historically, fatty liver syndrome has been considered as a co-morbidity with liver cirrhosis in patients who over consume alcohol. Increasingly, however, cases of non-alcoholic fatty liver syndrome are now seen in patients. That is, fatty liver presentations on liver biopsy are seen that are not based on alcohol use. This presentation has been termed Nonalcoholic Fatty Liver Disease (NAFLD).

NAFLD is strongly associated with both middle age and being overweight or obese. Its increase almost parallels increased cases of pre-diabetes and diabetes. This wave of health issues is related to poor diet, lack of exercise, and increased consumption of sugar-sweetened foods. Sugared beverages and sweetened consumer goods contribute to the onset of diseases such as diabetes (metabolic disease) and fatty liver disease.

In response, some cities and municipalities have instituted sugar taxes on soft drinks, primary sources of dietary sucrose and HFCS. It is believed that reducing calories by itself is not going to be a long term successful strategy. The human mind has evolved with a highly developed reward center attuned to sweet tastes and calories. For example, many of the same cities and municipalities that have instituted higher-priced, sugar-sweetened drinks have seen a spike in beer sales and sales of sugared beverages has moved outside the taxed area.

From a health perspective the presence of sweet calories in beverages or other consumer goods is not the only issue. In addition, the metabolic quality of those calories matters. Calories derived from glucose, for instance, can easily be catabolized and broken down by every tissue in the body; thus, the metabolic burden can be shared by all tissues. In contrast, calories from fructose are principally metabolized in the human liver. It is estimated that even a 30%-50% reduction in the level of total dietary fructose is not sufficient to guard against potential liver damage when consuming large amounts of sweetened products, such as soft drinks.

Metabolic syndrome is a constellation of risk factors that collectively are associated with increased risk for life-threatening diseases such as heart disease, diabetes, and stroke [1]. These risk factors include abdominal and visceral adiposity, high levels of blood triglycerides, low levels of high density lipoproteins (HDL) cholesterol, high blood pressure, and insulin resistance. As noted above, the contribution of dietary fructose to metabolic disorders has come under close scrutiny in recent years.

Epidemiological studies have shown that high fructose intake increases risk for the development of key components of metabolic syndrome [2, 3]. Controlled trials have shown that high fructose consumption acutely elevates blood pressure [4], promotes dyslipidemia [5], and increases visceral adiposity [6] and insulin resistance [7] to a significantly greater extent than comparable high glucose consumption. And importantly, isocaloric fructose restriction has been shown to ameliorate metabolic dysfunction in individuals with metabolic syndrome and even reduce total body weight [8].

Fructose may be associated with these metabolic problems because it is principally metabolized in the liver [9, 10]. Glucose metabolism, on the other hand, is regulated at several points in the glycolytic pathway, bypassing regulation in the liver [11]. When fructose consumption is high, its metabolism is unchecked and can contribute to the development of non-alcoholic fatty liver disease [11-13].

The inventors herein suggest the replacement of fructose with glucose in select combinations and concentrations, alone and preferably in conjunction with other sweeteners, in sweetened beverages and sweetened consumer goods, such sweetening systems designed not only to curb the prevalence of metabolic syndrome but to satiate the caloric desires of individuals consuming the same.

It should be noted that that some confections and foods that have replaced sucrose with the dietetic sweeteners, such as maltitol, have the negative side effects of poor browning reactions when cooking and when ingested can cause stomach cramps, gas, and diarrhea due to poor absorption (such as maltitol) in the gut. Glucose based sweeteners have none of these negative side effects. Modern soft drinks, or so called sodas are a major source of dietary fructose. Caloric soft drinks are typically sweetened with high fructose corn syrup (HFCS) in the US. The average American consumes 41.4 gallons of caloric soft drinks per year, which equates to 14.5 ounces per day [14], A typical 12 ounce (355 ml) soda contains 39 grams of HFCS in the form of HFCS 55 (55% fructose), the most commonly used beverage sweetening system. Thus, Americans consume on average roughly 26 grams of fructose from soft drinks per day [14]. As noted above, sucrose metabolism leads rapidly to fructose and glucose.

Although fructose is found in other food sources such as unsweetened fruit, fruit intake does not contribute a similar amount of fructose to the typical diet. For instance, Americans consume roughly 17.7 pounds of apples per capita per year (roughly 44 apples, assuming an average weight of 182 grams) [14]. One medium sized apple contains roughly 10 grams of fructose. To match the 26 grams of fructose from each soft drink, one needs to consume 2.5 apples per day, when converted from the 14.5 ounces of soda per day. This equates to about 950 apples per person per year, which clearly exceeds average consumption in America by over 20 fold. Of course, these calculations are averages that assume all people consume similar quantities of sweetened beverages. In reality, some people will consume much less, making them healthier, and others will consume much more, putting them at significantly greater health risk.

There has been substantial public concern over the amount of sugars such as sucrose and HFCS which are commonly added to enhance the taste of consumer goods. In response to public demand, the Food and Drug Administration has recently (2016) redesigned the "Nutrition Facts" label that is required for most packaged foods. The new label will display the amount of "added sugar" as well as a percentage of a "Daily Value", an amount of "sugar" consumption that might be considered a reasonable part of a daily 2000 calorie diet. The new label will be required by July, 2018.

Efforts to replace fructose in sweetened beverages and consumer goods have been largely unsuccessful. While yearly per capita consumption of caloric soft drinks is 41.4 gallons per year, the consumption of non-caloric soft drinks averages is roughly only 3 gallons per year [14], or only about 7% of the total consumed. While non-caloric sweeteners can match the sweetness intensity of the sugars, they are easily distinguished because of off-tastes, lingering aftertastes, and the absence of a caloric reward [15] [16].

As stated above, the vast majority of sweetened beverages (and other consumer goods) sold in the U.S. and elsewhere are sweetened by sugars such as sucrose and HFCS, indicating an apparent reluctance among U.S. consumers to drink non-sugared beverages. It is concluded that Americans, at least at the present time, prefer to drink sugared beverages. And based on the abundant popularity of sweetened consumer goods with added sucrose and HFCS, Americans likewise prefer to eat consumer goods with added sugars.

The inventors have recognized that one option for providing palatable, but fructose-free sugared beverages and consumer goods would be to incorporate glucose as one component of their exogenous flavoring sources.

However, glucose is only approximately one third to half as sweet as fructose, making fructose (or sweeteners containing fructose) a preferred sweetener [17]. Moreover, sucrose, which is 50% fructose on a molar basis, is roughly three times sweeter than glucose on a molar basis. The inventors have determined that on a volume basis, sweetness matched glucose-only beverage would contain approximately 150% more calories than a sucrose- or HFCS-sweetened beverage, an undesirable result. Such considerations would also apply to the case of non-liquid sweetened consumer goods. That is, to maintain sweetness perception of the non-liquid consumer goods, additional calories in the form of glucose would be needed to the extent that exogenous sucrose and HFCS in the sweetened item would have to be replaced.

HFCS, which approximates the invert sugar of sucrose (roughly equal parts glucose and fructose), is comparable in sweetness to sucrose on a calorie for calorie basis. The inventors have recognized to make a glucose sweetened beverage or sweetened consumer good that is free of fructose and is of comparable sweetness to a sucrose sweetened beverage, the glucose concentration must be increased significantly unless other sweetening elements are added.

It is recognized that the total metabolic burden of fructose to the consumer is the summation of all dietary sources of fructose consumed. It is the intent of the invention to minimize the intake of fructose from all dietary sources, while maintaining the flavor and sweetness appeal to the consumer. In some cases, it is the intent of the invention to enhance the flavor appeal of non-sweetened beverages and consumer goods by incorporating a sweetener system that does not increase the total fructose metabolic burden.

The inventors have realized that a mixture of glucose and a non-caloric sweetener can better match the taste profile of sucrose and HFCS, without increasing caloric content, while still providing a caloric reward and sense of satiety in beverages and other sweetened consumer goods.

What is needed, and what is heretofore unknown in the prior art, but is disclosed herein, are palatable sweetened beverages that do not comprise, or comprise a non-appreciable amount of sucrose or fructose (<0.002 molar in the case of a 355 ml beverage, or less than 1 gram per serving), but which provides a favorable taste profile while addressing the satiety reward system of humans and at the same time having little or no off-tastes or lingering aftertastes. Glucose sweetened non-liquid consumer goods are similarly disclosed.

SUMMARY OF INVENTION

In one aspect of the invention, there is disclosed a palatable sweetened beverage or sweetened consumer good which comprises a sweetener system that is essentially free of fructose and/or sucrose. Such sweetener systems provide a favorable taste profile along with a satiety reward with little or no off-tastes and lingering aftertastes. The fructose-free technology presented here helps a meliorate the risk of metabolic syndrome, obesity and diabetes by protecting the liver from undue metabolic stress.

The disclosed invention provides in embodiments compositions for palatable sweetened beverages and other sweetened consumer goods using exogenous flavor components with glucose and a non-fructose producing high potency sweetener that provide improved aftertaste, but will not contribute to diseases associated with high-level fructose consumption. The disclosed compositions may be used together or in any combination.

Given the disclosure herein, the artisan will readily understand that the sweetener system described can be utilized generally in consumer goods presently using sucrose and HFCS sweeteners to replace sucrose and HFCS, thereby reducing metabolic burden of dietary fructose, while maintaining sweetness and consumer appeal. Likewise, the artisan would understand that the sweetener system provided herein may be also used as an additive to unsweetened consumer goods so as to enhance their consumer appeal without adding to the consumer's fructose burden.

In one embodiment is disclosed a beverage comprising a sweetener system or composition that is essentially free (<0.002 M, or less than about 1 gram per serving) from fructose but possesses less off-taste and lingering aftertaste than conventional low-caloric beverages synthetically sweetened.

In another embodiment, the composition contains sufficient glucose (e.g., 40 g/serving) to stimulate the brain reward center but holds equal or fewer calories than standard soft drinks. In one embodiment is disclosed a coloring system for a beverage and consumer goods which provides supplemental health benefits.

Disclosed in embodiments is an exogenously flavored beverage composition or consumer good comprising stevioside and a non-fructose producing sweetener in ratio of about 0.07% stevioside/non-fructose producing sweetener to about 0.001% stevioside/non-fructose producing sweetener, containing less than about 1 gram of fructose per serving, which when consumed will not accelerate metabolic or liver disease or provoke other diseases such as cancer associated with synthetic dyes and colorants that are known in the art.

Further disclosed in embodiments are compositions for a reduced calorie, colored carbonated beverage that will not increase fatty liver syndrome due to the presence of fructose.

According one embodiment of the invention is disclosed a sweetened consumer good comprising an exogenous sweetening system comprising (i) glucose, (ii) optionally a glucose-based sugar polymer, (iii) a non-fructose producing high potency sweetener, (iv) optionally, a non-synthetic colorant, and (v), optionally an exogenous flavorant, wherein the consumer good comprises less than about 1 gram per serving of added HFCS, sucrose, or any form of fructose or fructose-containing saccharide.

In one non-limiting embodiment, the sweetened consumer good is a beverage. According to r non-limiting embodiments, the beverage is a carbonated beverage, a still beverage, a juice, a water beverage, a tea beverage, a beverage obtained from a sachet (a small bag or packet comprising a solid or powder) (such as a packet of material to put into a drink), a beverage obtained from a syrup mix, or a beverage obtained from a concentrate or syrup.

According to other non-limiting embodiments of the invention, the beverage comprises about 0.6 molar glucose or less, in conjunction with a high potency sweetener selected from the group consisting of stevioside, a rebaudioside or a mogroside or combinations thereof.

According to other non-limiting embodiments of the invention, in the sweetened beverage or in the sweetened consumer good the molar ratio of glucose to non-fructose producing high potency sweetener is within the range of about 600/0.007 millimolar/millimolar to about 100/0.07 millimolar/millimolar glucose/non-fructose producing high potency sweetener.

According to other non-limiting embodiments of the invention for the sweetened consumer good the optional glucose-based sugar 'polymer' is selected from the group consisting of maltose, trehalose, the malto-oligosaccharides or the isomalto-oligosaccharides or combinations thereof, all of which are comprised of glucose units.

In one embodiment, fructose or a fructose producing sweetener is also added to the beverage or consumer good but in an amount per dose below that associated with liver damage after repeated consumption (less than about 1 gram/dose)

According to other non-limiting embodiments of the invention the sweetened beverage is essentially free of fructose.

According to other non-limiting embodiments of the invention, the sweetened beverage or sweetened consumer good comprises the sugar alcohols maltose, trehalose, the malto-oligosaccharides or the isomalto-oligosaccharides or combinations thereof.

According to other non-limiting embodiments of the invention the high potency sweetener is selected from the group consisting of sucralose, acesulfame-K, cyclamate, aspartame, or combinations thereof.

According to other non-limiting embodiments of the invention a non-synthetic exogenous colorant is included such as the blue colorant derived from the *Ternatea* Processes.

According to other non-limiting embodiments of the invention a non-synthetic exogenous colorant is a purple colorant derived from the *Ternatea* Process wherein the pH is adjusted to greater than about 5.4 using a citrate buffer, or buffers comprising salts of malic, tartaric, phosphoric and ascorbic acids.

According to other non-limiting embodiments of the invention the non-synthetic exogenous colorant is also a flavoring agent.

According to other non-limiting embodiments of the invention the non-synthetic exogenous colorant is a red flavoring agent obtained from water soluble paprika.

According to other non-limiting embodiments of the invention the non-synthetic exogenous colorant is a green flavoring agent obtained from spinach, Swiss chard, collard greens, mustard greens, turnip greens, escarole or combinations thereof.

According to other non-limiting embodiments of the invention the non-synthetic exogenous colorant is the orange flavoring agent obtained from yams.

According to other non-limiting embodiments of the invention the optional exogenous flavorant is a water soluble capsicum or a capsaicinoid.

According to other non-limiting embodiments of the invention the optional exogenous flavorant comes from cold or warm water extracted chili varieties.

According to other non-limiting embodiments of the invention the optional exogenous flavorant additionally comprises the cactus or succulent flavors of blue agave and aloe plants.

According to other non-limiting embodiments of the invention the optional exogenous flavorant is obtained from ginger, safrole-free sassafras, turmeric, licorice, vanilla, cinnamon, cardamom, coriander, allspice, hops (coneflowers), fenugreek, nutmeg, clove, fennel, anise, wintergreen, peppermint, spearmint, yeast, seaweed, Kola nut, lime, lemon, orange, grapefruit, tangerine, nectarine, kumquat, apple, apricot, pear, peach, plum, fig, jujube, cherry, grape, persimmon, coconut, pineapple, passion fruit, guava, raspberry, blackberry, blueberry, boysenberry, gooseberry, lingonberry, cloudberry, black currant, red currant, or strawberry or combinations thereof.

According to other non-limiting embodiments of the invention the optional flavorant is oleocanthal or oleacin obtained from olives or related source.

According to another embodiment of the invention is a carbonated beverage comprising about 0.6 molar glucose and about 0.75 millimolar stevioside, wherein the beverage comprises less than 1 gram per serving of HFCS, sucrose, or any form of fructose or fructose-containing saccharide, further comprising a colorant obtained from *C. ternatea*, wherein the carbonated beverage is adjusted to a pH of about 2.7 to 4.3.

According to another embodiment of the invention is a still (non-carbonated) beverage comprising about 0.6 molar glucose and about 0.25 millimolar stevioside, wherein the beverage comprises less than 1 gram of HFCS, sucrose, or any form of fructose or fructose-containing saccharide per serving, the beverage further comprising a colorant obtained from *C. ternatea*, wherein the carbonated beverage is adjusted and buffered to a pH of about 2.7 to 4.3.

Disclosed in embodiments is an exogenously flavored sweetened consumer good comprising stevioside and a non-fructose producing sweetener in ratio of about 0.07% stevioside/non-fructose producing sweetener to about 0.001% stevioside/non-fructose producing sweetener which when consumed will not accelerate metabolic or liver disease or provoke other diseases such as cancer associated with synthetic dyes and colorants that are known in the art.

According to one embodiment of the invention is disclosed a beverage comprising an exogenous sweetening system comprising (I) glucose, (ii) optionally a glucose-based sugar polymer, (iii) a non-fructose producing high potency sweetener, (iv) optionally, a non-synthetic colorant, and (v), optionally an exogenous flavorant, wherein the beverage comprises less than about 1 gram per serving of HFCS, sucrose, or any form of fructose or fructose-containing saccharide.

According to other non-limiting embodiments, the consumer good is a food stuff selected from the group consisting of a non-beverage liquids, semi-solid food stuff, a solid food stuff, and a solid/liquid food stuff.

According to other non-limiting embodiments of the invention, the sweetened consumer good comprises a sweetener and about 1 grams or less of added fructose per serving, the sweetener comprising glucose and a high potency sweetener, the high potency sweetener selected from the group consisting of stevioside, a rebaudioside or a mogroside or combinations thereof.

According to other non-limiting embodiments of the invention, the molar ratio of glucose to non-fructose producing high potency sweetener in the beverage is within the range of about 600/0.007 millimolar/millimolar to about 100/0.07 millimolar/millimolar glucose/non-fructose producing high potency sweetener According to another embodiment of the invention, a non-fructose or a non-fructose producing sweetener is also added to an unsweetened consumer good, such sweeteners comprising glucose and a natural sweetener, the such sweeteners containing fructose in an amount (less than about 1 gram/dose) below that associated with liver damage after repeated consumption According to other non-limiting embodiments of the invention the sweetened consumer good is essentially free of fructose.

The present invention will now be more fully described with reference to the accompanying examples. It should be understood, however, that the following description is illustrative only and should not be taken in any way as a restriction on the generality of the invention specified above.

DETAILED DESCRIPTION OF PREFERRED EMBODIMENTS

As used herein an "exogenous flavor source" is a flavoring agent detectable by human taste buds obtained from a source outside of that from which glucose and/or a high potency sweetener is obtained.

As used herein a "non-fructose producing high potency sweetener" is a non-nutritive or low calorie agent which provides a greatly enhanced sweet sensation to an animal compared to the sweet sensation of an equal concentration of sucrose, but does not produce fructose upon it metabolism. Such sweetener is considered to be non-nutritive because the amount used to obtain its sweetening effect is small compared to the calorie load provided otherwise by the beverage.

Examples of such non-fructose producing high potency sweeteners obtained from plant sources are stevioside, the rebaudiosides and the mogrosides. Other examples of such sweeteners are aspartame, neotame, sucralose, acesulfame-K, saccharin, cyclamate, advantame and sucralose. Other non-fructose producing high potency sweeteners are protein based. Examples of such protein based sweeteners include miraculin, monellin, brazzein, curculin, mabinlin, pentadin, and thaumatin.

Each of these non-fructose producing high potency sweeteners, and all combinations thereof, are considered useful for the invention.

As used herein, the term "steviol glycosides" refers to the family of chemical compounds responsible for the sweet taste of the leaves of the South American plant *Stevia rebaudiana*. Such compounds have been identified specifically, for example, as stevioside, rebaudiosides A-E, and dulcoside A, all of which are identified as glycosides of steviol.

As used herein the term "stevioside" is a steviol glycoside sweetener identified by the chemical name: 13-[(2-O-beta-D-Glucopyranosyl-alpha-D-glucopyranosyl)oxy]kaur-16-en-18-oic acid beta-D-glucopyranosyl ester. Stevioside is contained, for example, in the commercial products Stevia and Truvia® along with other sweeteners and flavors. The sweetening power of stevioside is estimated to be roughly 250-300 times that of sucrose.

As used herein, the term "rebaudioside" refers to any and all of the family of steviol glycosides isolated from the plant *Stevia rebaudiana* used as sweeteners, identified, for instance, by the chemical names rebaudioside A, rebaudioside B, rebaudioside C, rebaudioside D, rebaudioside E and rebaudioside M.

As used herein the term "mogroside" refers to compounds from the family of curcurbitane glycosides, used as sweeteners, found in plants such as the gourd vine *Siraitia grosvenori*. For example, pure mogroside-5 is considered to be as much as 400 times as sweet as sucrose.

Additionally, other natural, non-fructose producing high potency sweeteners include the plant protein sweeteners such as miraculin, monellin, brazzein, curculin, mabinlin, pentadin, and thaumatin. According to the invention, such sweeteners will be useful for the invention at ranges from 20 nanomolar to 500 nanomolar.

Also included are non-fructose, naturally sweet compounds associated with sugars and their metabolites, including 3-6 carbon and 12 carbon polyols, examples of which are glycerin/glycerol (3-C), erythritol/meso-erythritol (4-C), xylitol (5-C), sorbitol, mannitol (6-C) and maltitol (D-sorbitol-glucopyranosyl) and isomalt (D-mannitol-glucopyranosyl) (12-C).

As used herein, "a consumer good" is a food stuff that is an item of sale or commerce which is consumed as a food.

As used herein, a "non-sweetened consumer good" is a food stuff which does not comprise added sweeteners. Such non-sweetened consumer goods may include beverages, non-beverage liquids, semi-solid food stuffs, solid food stuffs, and solid/liquid food stuffs.

As used herein, a "sweetened consumer good" is a food stuff which comprises added sweeteners. Such sweetened consumer goods may include beverages, non-beverage liquids, semi-solid food stuffs, solid food stuffs, and solid/liquid food stuffs.

As used herein, a "carbonated beverage" is a beverage which contains carbon dioxide and or carbonic acid, produced, for example, by bubbling carbon dioxide gas through an aqueous beverage solution.

As used herein, a "still beverage" is a non-carbonated beverage, typically an aqueous beverage. In either case, the carbonated or still beverages may comprise alcohol (ethanol).

As used herein, "tea" is an aromatic beverage commonly prepared by pouring hot or boiling water over the leaves of the *Camellia sinensis* and then steeping of which there are many types. "A tea," more generally, is any infusion of leaves, fruit or herbs parts made by extracting such with water.

As used herein, "a sachet" is a small packet filled with flavoring components such as sweeteners, and flavoring ingredients that may be used to create a flavored and/or sweetened beverage by pouring its ingredients into a liquid and mixing, e.g. a sachet of sugar to pour into your coffee to sweeten it.

Examples of "non-beverage liquids" are sauces such as ketchup, "Sriracha," BBQ sauce, steak sauces (A-1, Heinz, etc.), syrups (such as artificial maple), chocolate, caramel, peanut sauces, marinara sauce, and the like known to the artisan.

Examples of "semi-solid food stuffs" are yoghurts, puddings, custards, ice cream, popsicles, apple sauce, frosting, gelatin desserts, jams and jellies, peanut butter, and the like known to the artisan.

Examples of "solid food stuffs" are candies and confections, chewing gums, cakes, pies, cookies, pastries, breakfast cereals, instant cereals, snack and granola bars, breakfast bars, chips (corn, potato, multi-grain), breads, frozen pancakes and waffles (e.g. "Eggos®"), powder mixes to produce such, and the like known to the artisan.

As used herein the term "essentially free of fructose" means as including unavoidable levels of fructose as an impurity, but no more than that level.

As used herein, the term "about" is taken to include an approximate value within normal operating ranges, that is, unless otherwise indicated, a range of ±10% around a stated value. For instance, "about 0.6 molar" would generally mean "in the range of 0.54 molar to 0.66 molar." Similarly, "about 1 gram" would generally mean "in the range of 0.9 gram to 1.1 gram."

As used herein, the term "buffer" means a substance added to a beverage or consumer good with the purpose of maintaining the effective pH of beverage or consumer good within a desired range. Such buffers useful to the invention are well known to the artisan, e.g., inorganic anions such as phosphate, bicarbonate, borate and pyrophosphate and organic anions such as lactate, acetate, fumarate, pyruvate, succinate, alpha-ketoglutarate, gluconate, fumarate, malate, iso-citrate and citrate in equilibrium with their conjugate acids as examples. Within the scope of the invention, other molecules with acid-base properties found in foods include amino acids, proteins, and charged polysaccharides may be employed as buffers as known to the artisan.

As used herein, the term "glucose" (dextrose) refers to the aldohexose D-glucose, the form occurring widely in nature, in either its more stable glucopyranose forms or its acyclic form obtained in mixture, for instance, by hydrolyzing sucrose to obtain glucose and fructose.

As used herein, the term "fructose" (fruit sugar) refers to α-D-fructopyranose and its structural isomer α-D-fructofuranose, as well as its acyclic forms, obtained in mixture, for instance, by hydrolyzing sucrose to obtain glucose and fructose. "High fructose corn syrup" (HFCS) is a sweetener which may be made from corn starch that has been processed, for example, by glucose isomerase to convert some of its glucose into fructose. For example, HFCS 55 (containing 55% fructose) is predominantly used for sodas in the United States.

As used herein, the term "oligosaccharide" refers to a carbohydrate comprising two to ten monosaccharide residues. As used herein, the term "malto-oligosaccharide" or "MOS" refers to glucose oligomers with α-D-(1,4)-linkages and mixtures thereof. As used herein, the term "isomalto-oligosaccharide" or "IMO" refers to glucose oligomers with α-D-(1,6)-linkages and mixtures thereof.

As used herein, the term "glucose-based sugar polymer" refers, by example, to oligomeric glucose containing molecules such as maltose and trehalose and the like, and more complex molecules such as the malto-oligosaccharides and the isomalto-oligosaccharides, that is molecules comprising predominantly subunits of glucose linked via different configurations.

Stevioside concentrations ranging from 0.1 millimolar to 1.0 millimolar, used in combination with glucose concentrations ranging from 0.06 molar to 0.7 molar, are of utility for the invention. Such concentration ranges for stevioside and glucose span the compositions envisioned for full calorie sodas and reduced calorie sodas of the invention.

Rebaudioside concentrations, including rebaudoside A, rebaudoside B, rebaudoside C, rebaudoside D, rebaudoside E and rebaudoside M. ranging from 0.1 millimolar to 1.0 millimolar (and a Monk fruit glycoside, such as mogroside), used in combination with glucose concentrations ranging from 0.06 molar to 0.7 molar, are of utility for the invention. Such concentration ranges for rebaudiosides and glucose span the compositions envisioned for full calorie sodas and reduced calorie sodas of the invention.

Within the scope of the invention are suitable colorants and flavorants, preferably obtained from edible plant or vegetable sources. In many cases, the colorants also function as flavorants. Examples of suitable colorants and flavorants are those obtained from dried blossoms of C. ternatea (Stock Colorant Solution), the red flavorant which comes from water soluble paprika (which is a rich source of the carotenoid lycopene, associated with multiple health benefits, and is low in fructose).

Other flavorants/colorants come from spinach, swiss chard, collard greens, mustard greens, turnip greens and escarole (vegetables which provide green and red colors and are all low in fructose and also provide the carotenoid lutein associated with brain and cognitive health and improved vision). Still other examples of flavorants/colorants suitable for the invention, singly or in combination, are those obtained from ginger, safrole-free sassafras, turmeric, licorice, vanilla, cinnamon, cardamom, coriander, allspice, hops (coneflowers), fenugreek, nutmeg, clove, fennel, anise, wintergreen, peppermint, spearmint, yeast, seaweed, Kola nut, lime, lemon, orange, grapefruit, tangerine, nectarine, kumquat, apple, apricot, pear, peach, plum, fig, jujube, cherry, grape, persimmon, coconut, pineapple, passion fruit, guava, raspberry, blackberry, blueberry, boysenberry, gooseberry, lingonberry, cloudberry, black currant, red currant, or strawberry. The colorant caramel (containing 4-methylimidazole), which has been associated with cancer in humans, is an excluded embodiment of the invention.

Other examples of flavorants/colorants suitable for the invention are the orange colorant obtained from yams (which are low in fructose and high in the carotenoid α-carotene, a physiologically regulated source of vitamin A), the hot/spicy flavor which comes from a water-soluble capsicum (for instance, that sold by Kalsec Inc., 3713 West Main, P.O. Box 511, Kalamazoo, Mich. 49005-0511, under the trade designation oleoresin capsicum, water soluble) or other capsaicinoids that are naturally water soluble; flavorants that come from cold- or warm-water extracted chili varieties such as NuMex Big Jims, NuMex Joe E Parker, NuMex Heritage 6-4, sandias, poblanos, habaneros, and jalapenos). Other desirable flavorants include extractants from olives and related plants including the antioxidants and anti-inflammatories oleocanthal and oleacin. Additional flavorants are cactus flavors obtained from the blue agave and aloe, for example, Repasado and Anejo flavors (such cactus and succulent flavors resonate with the chili and pepper flavors regionally).

Example 1

Stevioside and Glucose Sweetened Still Beverage

Glucose, sucrose and stevia were ACS reagent-grade compounds. These sweeteners were dissolved in water (Millipore) and maintained at 20 degrees Celsius. All solutions were prepared at least 24 hours in liter volumes prior to use to allow for complete mutarotation of tautomers.

A test solution was prepared containing 0.6 M glucose and 0.24 mM stevioside in water. A reference solution containing 0.32 M sucrose in water was also prepared. The concentration of sucrose reflects the concentration of sugar in popular sodas. The concentration of glucose was chosen to match the concentration of sucrose in grams per liter.

Based on pilot testing, the addition of 0.24 mM stevioside to the glucose mixture made the mixture equally sweet compared to the sucrose solution.

Example 2

Stevioside and Glucose Sweetened Carbonated Beverage

A test solution was prepared in liter volumes as in Example 1 but containing 0.6 M glucose and 0.75 mM stevioside. Solutions were carbonated with a commercial carbonation device (SodaStream™) which was used according to the product instructions. Carbonation was found to exacerbate the difference in sweetness between the solutions, so the concentration of stevioside was increased to 0.75 millimolar. The reference solution contained 0.32 M sucrose.

Examples 3 and 4

Sweetness Discrimination Studies

A first study was made to determine if a palatable, fructose free non-carbonated mixture comprising glucose and the high potency sweetener stevioside (of Example 1) could be discriminated by taste from an equicaloric solution of non-carbonated sucrose.

A second study was also made to determine if a fructose free carbonated beverage (soda) (of Example 2) could be found comparable to a sucrose sweetened soda in overall taste and palatability. It was sought to determine whether a carbonated glucose and stevioside sweetened beverage could be generated that was comparable in palatability to a sucrose sweetened beverages.

For the first study, 12 subjects of both sexes were recruited. For the second study, 10 subjects were recruited in a similar fashion. Subjects were paid to participate and provided informed consent. Subjects were asked to refrain from eating, drinking, and smoking for one hour prior to each session. Prior to enrollment in the experiment, subjects were asked to rate the intensity of five concentrations of NaCl increasing in half logarithmic steps.

Subjects whose ratings did not increase monotonically with NaCl concentration were excused, on the assumption that they had abnormal taste or were unable to follow instructions.

For the first study, the reference solution contained 0.32 M sucrose. The test solution of Example 1 contained 0.6 M glucose and 0.24 mM stevioside. As noted above, the concentration of sucrose in the reference solution reflects the concentration of sugar in popular sodas. The concentration of glucose was chosen to match the grams of sucrose used per liter.

Based on pilot testing, the addition of 0.24 mM stevioside to the glucose mixture made the mixture equally sweet compared to the sucrose reference solution.

For the second study, samples were carbonated using a commercial carbonation product. Carbonation exacerbated the difference in sweetness between the solutions, so the concentration of stevioside was increased to 0.75 millimolar. The reference solution contained 0.32 M sucrose. The test solution (Example 2) contained 0.608 M glucose and 0.75 mM stevioside.

A "Duo-Trio Taste Discrimination Protocol" was practiced. Subjects participated in two test sessions per day with κ sessions per week for a total of 12 sessions. Each session comprised 5 discrimination trials. In total, each subject performed 60 trials. Subjects rinsed the whole mouth thoroughly with water prior to testing. 10 mL samples were presented in 1 ounce (30 ml) medicine cups.

For each trial subjects were presented with a referent sample, followed by two coded samples. One of the two coded samples matched the referent. Subjects were asked to indicate which coded sample matched the referent. Solutions were tasted from left to right, with water rinsing between each cup. Subjects rinsed three times between stimuli. Answers were scored as correct or incorrect.

The proportion of correct answers for each participant was analyzed using binomial distribution tables and chi square tests (both methods gave similar results. binomial tables indicated 37 correct answers minimum, chi square gave 38 correct answers minimum.).

A minimum of 37 correct answers out of 60 repetitions was required to indicate that a difference existed between the solutions at an α=0.05 level. A minimum of 40 correct answers was required to indicate a difference at an α=0.1 level.

In the study of non-carbonated beverages, seven of twelve participants gave at least 37 correct answers and were thus able to discriminate between 0.32 M sucrose and 0.608 M glucose+0.235 mM stevioside. Of the 720 total trials, there were 457 correct answers (63% correct). Results are shown in Table 1.

To help eliminate excess fructose intake from the diet, it is disclosed here that sucrose, a disaccharide of glucose and fructose, is indistinguishable from an equicaloric glucose solution mixed with the natural non-caloric sweetener stevioside for approximately half of subjects. This observation demonstrates that despite being considerably less sweet, glucose can serve as a fructose-free, equicaloric sweetener system for beverages and other consumer goods.

In the first study, five of twelve participants gave fewer than 37 out of 60 correct answers (>65% correct) when trying to distinguish a glucose+stevia sweetened beverage from a sucrose sweetened beverage matched for sweet intensity. Of the seven participants who gave 37 or more correct answers, four gave no more than 41 correct answers (68% correct). The remaining three participants gave 42 or more correct answers. Thus, overall nine of the 12 subjects had great difficulty discriminating between these two sweetener systems. On average, subjects could discriminate non-carbonated sucrose from a mixture of glucose and stevia in 457 of 720 trials (63%).

When the solutions were carbonated to better reflect the major sensory qualities of soda, seven of ten participants gave fewer than 37 out of 60 correct answers. Hence, these seven subjects were not able to discriminate between the two sweetener systems. Of the five remaining participants who gave 37 or more correct answers, two gave fewer than 40 correct answers. Thus, again nine of the 12 subjects had great difficulty discriminating between the glucose+stevia and the sucrose sweetener systems in a model soda.

In total, participants could discriminate carbonated sucrose from carbonated glucose+stevia in 400 of 600 trials (67%).

TABLE 1

Results of duo-trio test comparison of 0.32 M sucrose and 0.608 M glucose and 0.232 mM stevioside

| | Subject ID | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | Total |
| Correct | 27 | 34 | 56 | 45 | 40 | 35 | 29 | 41 | 42 | 41 | 37 | 30 | 457 |
| Incorrect | 33 | 26 | 4 | 15 | 20 | 25 | 31 | 19 | 18 | 19 | 23 | 30 | 263 |
| % Incorrect | 45% | 57% | 93% | 75% | 67% | 58% | 48% | 68% | 70% | 68% | 62% | 60% | 63% |

Twelve participants were each tested in 60 replicates. 7 of 12 participants were able to discriminate between sucrose and glucose+stevioside.

In the study of carbonated beverages, seven of ten participants (70%) gave at least 37 correct answers and were thus able to discriminate between carbonated 0.32 M sucrose and 0.608 M glucose+0.75 mM stevioside. Of the 600 total trials, there were 400 correct answers (67% correct). Results are shown in Table 2.

These results provide proof-of-principle that it is feasible to produce a fructose free soda, which is similar to sodas made with sucrose or HFCS. It is important to note here that the two-alternative forced-choice techniques employed enable subjects to detect and discriminate with high sensitivity. Therefore, for these nine subjects the two types of beverages were indistinguishable or extremely similar. The glucose plus stevia sweetened beverage has the same total sugar content as the sucrose sweetened beverage and, there-

TABLE 2

Results of duo-trio test comparison of carbonated 0.32 M sucrose and 0.608 M glucose + 0.75 mM stevioside. 12 participants were each tested in 60 replicates. 7 of 10 participants were able to discriminate between sucrose and glucose + stevioside.

| | Subject ID | | | | | | | | | | |
|---|---|---|---|---|---|---|---|---|---|---|---|
| | 1 | 2 | 3 | 4 | 5 | 6 | 7 | 8 | 9 | 10 | Total |
| Correct | 36 | 48 | 37 | 42 | 30 | 45 | 44 | 38 | 33 | 47 | 400 |
| Incorrect | 24 | 12 | 23 | 18 | 30 | 15 | 16 | 22 | 27 | 13 | 200 |
| % Incorrect | 60% | 80% | 62% | 70% | 50% | 75% | 73% | 63% | 55% | 78% | 67% | fore, the same amount of calories. Substituting glucose sweetened beverages for those sweetened with sucrose or HFCS would not reduce caloric intake, but would reduce fructose intake by an average of 26 grams per day and 9.5 kilograms per year [14]. This reduction relieves a major stress on the liver and could delay or prevent the onset of the metabolic syndrome risk factors associated with excessive fructose intake [8]. Furthermore, levels of glucose presented in the beverage may also be reduced.

These risk factors, including elevated blood pressure, dyslipidemia, visceral adiposity, and insulin resistance are promoted by high fructose intake but not high glucose intake [4-8]. A recent clinical study [8] found that iso-caloric substitution of starch for sugar in obese children with metabolic syndrome reduced their diastolic blood pressure, plasma triglycerides and HDL cholesterol, hyperinsulinemia and glucose intolerance, and body weight. All of this was accomplished simply by reducing their daily fructose intake.

Water is an ideal replacement for both HFCS and sucrose sweetened sodas because it contains neither fructose nor calories. Yet, asking Americans to decrease ingestion of sugar sweetened beverages voluntarily is unlikely to succeed at a national level. Bottled water and diet soda is widely available yet caloried soda consumption widely persists.

Diet sodas were developed to satisfy the need for sweet but reduce energy density. Though non-nutritive sweeteners can match the sweetness intensity of sugars, diet soda is not as popular as caloric soda [14]. Theories as to why diet sodas are not as preferred as much as sugar sodas include: a) the fear that artificial sweetener systems are less healthy than sugar and may cause diseases, b) the dislike of high potency sweetener system taste profiles [16], c) fear of eating foods that are deemed unnatural, and d) the lack of caloric reward or reinforcement to drive future consumption [19].

Some evidence suggests that non-caloric sodas do little to reduce appetite and may in fact promote it [20, 21]. Conversely, other evidence shows that diet soda is more effective than water in promoting weight loss. Presently, diet sodas comprise only 10-30% of the soda market. Presently, diet sodas comprise only 10-30% of the soda market. Because diet sodas have failed to replace HFCS sweetened sodas in the United States, they have done little to curb rates of obesity or metabolic syndrome. Although an equicaloric, glucose sweetened beverage will not reduce energy intake, it will have much greater appeal than diet sodas and can feasibly replace a larger proportion of fructose in the American diet by removing HFCS and sucrose sweetened beverages. Moreover, an equicaloric glucose sweetened beverage will reduce plasma dyslipidemias, HDL cholesterol, insulin insensitivity, and promote weight loss.

Example 5

Preparation of Stock Colorant Solution (*Ternatea* Process)

25 g of dried butterfly pea (*Clitoria ternatea*) flowers was added to 500 ml of reverse osmosis (Millipore) filtered water. After boiling for 20 minutes, an additional 500 ml was added and boiling proceeded for another 10 minutes. The extract was filtered through several layers of cheese cloth into a sterilized bottle and allowed to cool. This concentrated extract is Stock Colorant Solution in water. The Stock Colorant Solution may be used immediately or stored at 2-8 degrees Celsius until use.

Stock Colorant Solution has a very dark indigo color. When diluted 10:1 with water the stock solution gives a dark indigo solution with pH of 5.36. The diluted solution provided a purple pink color when the pH of the solution was lowered to 2.46 with the addition of L-ascorbic acid.

The 10:1 diluted Stock Colorant Solution was buffered to 3 different pH values using a citric acid and sodium citrate buffer system. The colors at different pHs was as follows: pH 2.72, purple pink; pH 3.2, blue; pH 4.25, darker blue.

Examples of other suitable systems for pH adjustment of compositions of the invention are malic, tartaric, phosphoric and ascorbic acids and their salts and other organic and inorganic acids and their salts known to the artisan.

Example 6

Preparation of Pink/Purple Soda

Pink/Purple Soda was prepared by combining 200 ml of pH 3.1 Soda Syrup with 1 tablespoon (15 grams) of Stock Colorant Solution in water. The mixture was diluted to 1000 mL using reverse osmosis filtered water. This solution was carbonated using a Soda Stream carbonator and then stored in capped 12 oz. sterilized bottles.

Example 8

Preparation of Blue Soda

Pink/Purple Soda was prepared by combining 200 ml of pH 3.1 Soda Syrup with 1 tablespoon (15 grams) of Stock Colorant Solution in water. The mixture was diluted to 1000 mL using reverse osmosis filtered water. This solution was carbonated using a Soda Stream carbonator and then stored in capped 12 oz. sterilized bottles.

In one embodiment of the invention, a full-caloried beverage comprises about 0.61 M Glucose and 0.75 mM stevioside for a 12 ounce (355 ml) serving. This beverage is equally caloric to a soda containing 39 g of HFCS. According to the invention, stevioside sweetener may be replaced with rebaudioside D (the least bitter natural sweetener in Stevia) and/or other related sweeteners such as the mogrosides from Luo Han Guo (Monk Fruit), or others as described previously herein as high potency sweeteners.

Alternatively, the high potency sweetener added to this glucose beverage could be of the synthetic variety such as sucralose, acesulfame-K, cyclamate, aspartame or any combination thereof.

As envisioned within the scope of the invention, lower calorie versions of this beverage can be created by lowering the level of glucose in the beverage with concomitant increases in high potency sweetener. Such beverages would comprise less than about 0.6 M glucose. According to the invention, for a satisfactory result, glucose should not be lowered to less than about 10% of its caloric value, not less than a concentration of about 60 millimolar.

Further as envisioned within the scope of the invention, beverages containing glucose can be substituted up to 10% with maltose and small chain malto-oligosaccharides (MOS). MOS are comprised entirely of glucose polymers, and contain no fructose, but have a different flavor/taste profile from glucose that people find reinforcing.

This invention has been described with reference to its preferred embodiments. Variations and modifications of the invention will be obvious to those skilled in the art from the foregoing detailed description of the invention. It is intended that all of these variations and modifications be included within the scope of the appended claims.

REFERENCES

1. Kaur, J. A comprehensive review on metabolic syndrome. Cardiol. Res, Pract., 2014, 943162,
2. Hosseini-Esfahani, F., Bahadoran, Z., Mirmiran, P., Hosseinpour-Niazi, S., Hosseinpanah, F., and Azizi, F. (2011). Dietary fructose and risk of metabolic syndrome in adults: Tehran Lipid and Glucose study. Nutrition & Metabolism, 8.
3. Pollock, N. K., Bundy, V., Kanta, W., Davis, C. L., Bernard, P. J., Zhu, H., Gutin, B., and Dong, Y. Greater fructose consumption is associated with cardiometabolic risk markers and visceral adiposity in adolescents. J. Nutr. 142, 251-257.
4. Brown, C. M., Dulloo, A. G., Yepuri, G., and Montani, J. P. (2008). Fructose ingestion acutely raises blood pressure in healthy young adults. International Journal of Obesity 32, S77-S77.
5, Macdonald, I. (1966). Influence of fructose and glucose on serum lipid levels in men and pre- and postmenopausal women. Am. J. Clin. Nutr. 18, 369-372.
6, Stanhope, K. L., Schwarz, J. M., Kelm, N. L., Griffen, S. C., Bremer, A. A., Graham, J. L., Hatcher, B., Cox, C. L., Dyachenko, A., Zhang, W., et al. (2009), Consuming fructose-sweetened, not glucose-sweetened, beverages increases visceral adiposity and lipids and decreases insulin sensitivity in overweight/obese humans. Journal of Clinical Investigation, 119, 1322-1334,
7. Beck-Nielsen, H., Pedersen, O., and Lindskov, H. O. (1980). Impaired cellular insulin binding and insulin sensitivity induced by high-fructose feeding in normal subjects. Am. J. Clin. Nutr., 33, 273-278.
8, Lustig, R. H., Mulligan, K., Noworolski, S. M., Tal, V. W., Wen, M. J., Erkin-Cakmak, A., Gugliucci, A., and Schwarz, J. M. Isocaloric fructose restriction and metabolic improvement in children with obesity and metabolic syndrome. Obesity (Silver Spring) 24, 453-460,
9. Samuel, V. T. Fructose induced lipogenesis: from sugar to fat to insulin resistance. Trends Endocrinol. Metab. 22, 60-65.
10. Schwarz, J. M., Noworolski, S. M., Wen, M. J., Dyachenko, A., Prior, J. L., Weinberg, M. E., Herraiz, L. A., Tai, V. W., Bergeron, N., Bersot, T. P., et al. Effect of a High-Fructose Weight-Maintaining Diet on Lipogenesis and Liver Fat. J. Clin. Endocrinol. Metab., 100, 2434-2442.
11, Mayes, P. A. (1993), Intermediary metabolism of fructose. Am. J. Clin. Nutr., 58, 754S-765S.
12. Stanhope, K. L., Schwarz, J. M., and Havel, P. J. Adverse metabolic effects of dietary fructose: results from the recent epidemiological, clinical, and mechanistic studies. Curr. Opin. Lipidol., 24, 198-206,
13. Ouyang, X., Cirillo, P., Sautin, Y., McCall, S., Bruchette, J. L., Diehl, A. M., Johnson, R. J., and Abdelmalek, M. F. (2008), Fructose consumption as a risk factor for non-alcoholic fatty liver disease. J Hepatol., 48, 993-999.
14. United States. Department of Agriculture. Economic Research Service. Food consumption, prices, and expenditures. In Statistical bulletin. ([Washington, D.C.]: Economic Research Service), p. volumes.
15. Perez, C., Lucas, F., and Sclafani, A. (1998). Increased flavor acceptance and preference conditioned by the postingestive actions of glucose. Physiol. Behav., 64, 483-492.
16. DuBois, G. E., and Prakash, I, (2012). Non-Caloric Sweeteners, Sweetness Modulators, and Sweetener Enhancers. Annual Review of Food Science and Technology, Vol 33, 353-380.
17. Breslin, P. A., Beauchamp, G. K., and Pugh, E. N., Jr. (1996). Monogeusia for fructose, glucose, sucrose, and maltose. Percept. Psychophys., 58, 327-341.
18. Majchrzak, D., Ipsen, A., and Koenig, J. Sucrose-replacement by rebaudioside a in a model beverage. J. Food. Sci. Technol., 52, 6031-6036,
19. Sclafani, A. (2012). Gut-brain nutrient signaling. Appetition vs. satiation. Appetite.
20. Tordoff, M. G., and Alleva, A. M. (1990). Oral stimulation with aspartame increases hunger. Physiol. Behav., 47, 555-559.
21. Black, R. M., Leiter, L. A., and Anderson, G. H. (1993). Consuming aspartame with and without taste: differential effects on appetite and food intake of young adult males. Physiol. Behav., 53, 459-466.

What is claimed is:

1. A sweetened consumer good comprising an exogenous sweetening system comprising (i) glucose, (ii) optionally a glucose based sugar polymer, (iii) a protein based non-fructose producing high potency sweetener, (iv) optionally, a non-synthetic colorant, and (v) optionally a flavorant, wherein the consumer good comprises less than about 1 gram per serving of added HFCS, sucrose, or any form of fructose or fructose-containing saccharide.

2. The sweetened consumer good of claim 1, selected from the group consisting of non-beverage liquids, semi-solid food stuffs, solid food stuffs and solid-liquid mixture food stuffs.

3. The non-beverage liquid of claim 2 that is a selected from the group consisting of sauces and syrups.

4. The semisolid food stuff of claim 2 that is selected from the group consisting of yoghurts, puddings, custards, ice creams, popsicles, apple sauces, frostings, gelatin desserts, jam & jellies, and peanut butters.

5. The solid food stuff of claim 2 that is selected from the group consisting of candies, confections, chewing gums, cakes, pies, cookies, pastries, breakfast cereals, instant cereals, snacks, granola bars, breakfast bars, chips, breads, frozen pancakes and waffles.

6. The sweetened consumer good of claim 1 that is essentially free of added fructose.

7. The sweetened consumer good of claim 1, wherein the high potency sweetener is selected from the group consisting of miraculin, monellin, brazzein, curculin, mabinlin, pentadin, and thaumatin or combinations thereof.

8. The sweetened consumer good of claim 1 wherein the non-fructose producing high potency sweetener is within the range of about 20 nanomolar to 500 nanomolar.

9. The sweetened consumer good of claim 1, wherein the glucose based sugar polymer is selected from the group consisting of maltose, trehalose, the malto-oligosaccharides or the isomalto-oligosaccharides or combinations thereof.

10. The sweetened consumer good of claim 1 wherein the pH of the sweetener system comprises citrate buffer or buffers comprising salts of malic, tartaric, phosphoric, and ascorbic acids or combinations thereof.

11. A fructose-free non-sweetened consumer good sweetened by the addition of an exogenous sweetening system comprising (i) about 38.3 grams glucose, (ii) optionally a glucose-based sugar polymer, (iii) about 0.211 grams of stevoside non-fructose producing high potency sweetener, (iv) optionally, a non-synthetic colorant, (v) optionally a flavorant, and (vi) water to form one twelve ounce serving, wherein the consumer good comprises less than about 1 gram per serving of added HFCS, sucrose, or any form of fructose or fructose-containing saccharide and said serving is equally caloric to a soda containing about 39 grams of high fructose corn syrup.

12. A sweetened consumer good comprising an exogenous sweetening system comprising (i) about 0.6 M glucose, (ii) optionally a glucose-based sugar polymer, (iii) about 0.24 mM of a non-fructose producing high potency sweetener, (iv) optionally, a non-synthetic colorant, (v) optionally a flavorant, and (vi) water, wherein the consumer good comprises less than about 1 gram per serving of HFCS, sucrose, or any form of fructose or fructose-containing saccharide and is substantially equal in sweetness to a reference solution containing about 0.32 M sucrose in water.

* * * * *